United States Patent Office 2,764,599
Patented Sept. 25, 1956

2,764,599
PARA TERTIARY BUTYL BENZOYL AZIDE

Albert M. Clifford, Stow, Samuel W. Waisbrot, Akron, and George H. Gates, Cuyahoga Falls, Ohio, assignors, by mesne assignments, to The Goodyear Tire & Rubber Company, a corporation of Ohio No Drawing. Application July 14, 1951,
Serial No. 236,856

1 Claim. (Cl. 260—349)

This invention relates to cellular materials and more particularly to the use of an organic carbonyl azide as a blowing agent in the production of cellular materials.

Many chemical blowing agents are known, including the carbonates, the sulfites, the nitrites, the triazines, the sulfonyl hydrazides and the sulfonyl azides. Many factors determine the usefulness of these blowing or gas-evolving agents. For example, it is important that the decomposition products of the blowing agent be non-toxic. It is also important that one be able to control the rate at which the agent is decomposed. Under certain conditions of use, agents evolving carbon dioxide may not be used, nitrogen generally being the preferred gas. It is also important that the blowing agent release its gas at a temperature at which the material is blowable or becomes blowable and that the agent function in a tightly closed mold. If the agent decomposes before the material is capable of being blown, no blowing of material results. It is also important that the blowing agent be uniformly dispersible or soluble in the material to be blown in order that a uniform blow can be accomplished. The by-products of the decomposed blowing agent should not discolor the material nor impart a bad order to the blown stock.

Many blowing agents have been used including compounds having the general formula $(RR'—C(CH)N:)_2$ where R is methyl and hydrogen and R' is ethyl, n-propyl, isopropyl, n-butyl, isobutyl and carboxyethyl and as a specific agent $\alpha,\alpha'$-azobis-isobutyronitrile

but this compound possesses a high vapor pressure and is toxic; diazoaminobenzene and the pentazdienes but these also produce color which leaches out onto materials in contact with the product blown with these agents; benzene sulfonyl hydrazide but on decomposition gives sulfur containing products which have a mercaptan-like odor; and dinitrosopentamethylene tetramine but requires high temperatures or a catalyst for decomposition and some products made with the tetramine became charred from too rapid exothermic reaction.

It has now been discovered that the organic carbonyl azides are admirably adapted as blowing agents for compositions of matter capable of being blown, including natural rubber and the synthetic rubbers, particularly the rubbery copolymers of a conjugated diene, particularly butadiene-1,3, either polymerized alone or copolymerized with other copolymerizable materials including the acrylates, vinyl pyridine, acrylonitrile, and the vinyl aromatic monomers such as styrene, etc. Other synthetic rubbers include Thiokol (polyalkylenesulfides), Lactoprene (95% ethyl acrylate 5% chlorovinyl ether), butyl rubber and others. Polyethylene as well as polystyrene may be bown with an organic carbonyl azide. The acetals, including polyvinyl acetal and polyvinylbutyral, may be advantageously treated. The resinous copolymers resulting from the copolymerization of a conjugated diene hydrocarbon such as butadiene-1,3 with an aromatic vinyl monomer such as styrene, in which the diene constituent is present in an amount by less than 50%, may also be blown with an organic carbonyl azide. Exceptional products are produced when resinous copolymers of, for example, butadiene-1,3 with, for example, styrene, are blended with a rubbery constituent such as natural rubber or any of the well-known synthetic rubbers, such as GR-S, and blown.

Exceptional cellular products are produced when polyvinyl chloride resins and polyvinyl chloride copolymer resins are blown with these organic carbonyl azides. Interesting sponges are produced from the urea formaldehyde resins, polyacrylates and polymethacrylates. By sponge throughout the specification and claim is meant a pore structure having closed non-communicating cells.

The organic carbonyl azides used in this invention have the structural formula

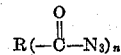

in which R is an organic radical and $n$ is 1, 2 or 3, and may be prepared by converting the corresponding acid to the hydrazide which is then treated with nitrous acid to form the azide or by treating the corresponding acid chloride with dry or an aqueous solution of sodium azide.

The aromatic carbonyl azides of this general formula include those in which R is phenyl and naphthyl. A specific unsubstituted aromatic carbonyl azide is phenyl carbonyl azide, also referred to as benzoyl azide, and as benzazide. The substituted carbonyl azides may be used and include para tertiary butyl benzoyl azide, o-, m- and p-nitro benzoyl azide, p-methyl benzoyl azide, m- and p-chloro benzoyl azide, o-, m-, and p-hydroxy benzoyl azide, p-methoxy-benzoyl azide, and p-ethoxybenzoyl azide.

The saturated aliphatic carbonyl azides may be used, including isovaleric azide, pivalic azide, lauroyl azide, palmitoyl azide and stearoyl azide. The aliphatic carbonyl diazides may be used and include succinyl azide, malonyl azide and adipyl azide. The aromatic carbonyl diazides may be used and include o-, m- and p-phthalyl diazide.

As an example of the preparation of one of the preferred blowing agents of this invention may be cited the preparation of p-tertiary butyl benzoyl azide. One mol of para tertiary butyl benzoic acid is reacted with 1 mol of phosphorous pentachloride, at room temperature (70° F.), to produce the corresponding acid chloride. One mol of a 50% acetone solution of para tertiary butyl benzoyl chloride is reacted with 1 mol of a 35% water solution of sodium azide at 50° C., to produce p-tertiary butyl benzoyl azide. Any suitable agent other than phosphorous pentachloride may be used including thionyl chloride for producing the acid chloride. The p-teritary butyl benzoyl chloride is reacted with any suitable metal azide at a temperature under 122° F. to form the organic azide which is recovered by filtering off the liquid from the solid product, which is then washed with cold water (60° F.) to remove water soluble contaminates. The resulting azide is a free flowing white crystalline solid having a M. P. of 64–65° C.

The other organic azides are made in a manner similar to the manner described for the manufacture of para tertiary butyl benzoyl azide.

It is desirable that these organic caronyl azides be relatively stable with regard to the evolution of nitrogen at room temperature. For the purposes of the present invention, an organic carbonyl azide is considered to be adequately stable for use in this invention when it does not give off more than 25% of its nitrogen at room temperature (70° F) within a period of 10 hours. It is also desirable that the organic carbonyl azide give off at least 25% of its nitrogen at a temperature of at least 350° F. within at least 2 hours. It is also of practical importance that these organic carbonyl azides be soluble or dispersible throughout the composition to be blown. These carbonyl azides, particularly the aryl carbonyl azides, for example benzoyl azide and tertiary butyl benzoyl azide, are soluble in the plasticizers used in producing an organisol or plastisol mixture of, example, the polyvinyl chloride resins and the polyvinyl chloride copolymer resins. The dispersibility of these azides is particularly noted with regard to polyvinyl chloride and the copolymers of vinyl chloride with the alkyl maleates and fumarates, particularly diethyl maleate and diethyl fumarate, with vinyl acetate and with vinylidene chloride.

The same condition of dispersibility of these phenyl carbonyl azides is observed in regard to the blowing of the resinous copolymers of a conjugated diene hydrocaron, for example, butadiene-1,3 and a vinyl aromatic monomer, for example, styrene, and also with the blends of these resinous copolymers with a rubber material such as natural rubber or the conventional synthetic rubbers such as GR–S which is the rubbery copolymer of butadiene-1,3 and styrene, and GR–N which is the rubbery copolymer of butadiene-1,3 and acrylonitrile.

The density of the cellular composition may be controlled through the amount of the organic carbonyl azide being used and the temperature at which the expansion of the decomposition products of the azide is carried out. The density of the cellular product may also be controlled by adjusting the viscosity of the material being blown at the temperature at which it becomes blowable. When the blowing is carried out in such a way that the nitrogen released through the decomposition of the carbonyl azide produces a microscopically small cell, the resulting cellular mass is relatively rigid and stiff compared to a cellular product in which the cells are much larger. It requires considerable effort to compress even slightly the small cell size blown material, whereas considerably less effort is needed to compress the larger cell size blown material.

The cellular products of this invention may be used for many different purposes. For example, the cellular vinyl chloride polymers may be used in the production of life rafts because the cellular material is impervious to moisture and resistant to deterioration by salt water and sun rays. Cellular material made from natural ruber in relatively thin gauge is useful as under-carpet padding. Cellular material made from urea formaldehyde resins is useful as an insulation material against heat transfer. Cellular materials of blends of the resinous copolymers of a butadiene and styrene with a rubbery composition may be used as leather substitutes, particularly in the manufacture of insoles and outsoles for footwear. Cellular rubbery acrylonitrile/diene copolymers are particularly useful where resistance to deterioration from contact with oils and gasoline is desirable.

The organic carbonyl azides may be used in amounts from .05% to 40% and desirably from 1% to 20%, it being understood that the blowing agent is most economically used when sufficient agent is incorporated into the blowable material to produce the desired sponge density. The azides mentioned above may be used in combination with each other as well as separately to obtain the desired results.

The following examples illustrate specific embodiments of the invention, the parts being by weight unless otherwise indicated.

*Example 1*

The following formulation was used in making the cellular product of this invention.

| | Parts |
|---|---|
| Polyvinyl chloride resin | 100 |
| Octyl diphenyl phosphate as a plasticizer | 90 |
| Dioctyl phthalate as a plasticizer | 35 |
| Calcined magnesia as a pigment | 5 |
| n-Propyl alcohol | 8.75 |
| p-Tertiary butyl benzazide as a blowing agent | 30 |

The polyvinyl chloride in the form of a powder was made into a plastisol by mixing the resin with the plasticizer using small amounts of the resin and small amounts of the plasticizer as the addition of the one was made to the other. The stabilizer was also added during the mixing operation. The plastisol mixture which was heated to a temperature of about 100° F. was cooled down to room temperature, 70° F., and the blowing agent together with the quenching agent n-propyl alcohol was then added to the cooled plastisol mixture of resin, plasticizer, and stabilizer. After the blowing agent had been added, the mixture was transferred to a mold and cured at 350° F. for 10 minutes. After the material was cooled in the mold 70° F., it was removed from the mold and expanded in an oven at 250° F. for 30 minutes to produce a cellular plastic material having a density of 4.26 pounds per cubic foot. When this same material was expanded in an oven at 200° F for 30 minutes, the density of the resulting cellular material was 5 pounds per cubic foot.

*Example 2*

The following formulation was used in making a cellular polyvinyl plastic material:

| | Parts |
|---|---|
| Polyvinyl chloride resin | 100 |
| Octyl diphenyl phosphate as a plasticizer | 94 |
| Dioctyl phthalate as a plasticizer | 31 |
| Magnesium oxide as a stabilizer | 5 |
| Phenyl carbonyl azide as a blowing agent | 8.5 |
| Water as a quenching agent | .57 |

The resin was formed into a plastisol by gradually mixing the resin with the plasticizer. The stabilizer was mixed into the resin and plasticizer at the same time. The benzazide together with a small amount of water was stirred into the mixture and then placed into a mold and cured at 330° F. for 20 minutes. The water used as a quenching agent converts the unstable by-products resulting from the decomposition of the azide to stable products and also supplies additional gas in the form of $CO_2$. The heated mixture was then removed from the mold, cooled to 70° F. and expanded in an oven at 200° F. for 15 minutes to produce a cellular material having a density of 15 pounds per cubic foot.

*Example 3*

The following general formula was used in making the cellular material of this invention.

| | Parts |
|---|---|
| Rubbery copolymer of 75% butadiene-1,3 and 25% styrene | 100 |
| Sulfur as a curing agent | 2.5 |
| Mercapto benzothiazole disulfide as an accelerator | 1.5 |
| Diorthotolyl guanidine as a secondary accelerator | 0.5 |
| Zinc oxide as an activator | 5.0 |
| Loading (silica, clay) as desired | 0 to 100 |
| Softener (petroleum oil, coal tar derivatives) as desired | 5 to 25 |
| Resinous copolymer of 15% butadiene-1,3 and 85% styrene as a stiffening agent | 5 to 100 |
| Benzazide as a blowing agent | 4 to 15 |
| Quenching agent as desired | 0 to 6 |

The rubbery copolymer is compounded with the resinous copolymer on a rubber mill or Banbury and the other ingredients, with the exception of the benzazide, are added in small amounts until all of these ingredients have been uniformly incorporated into the homogeneous mixture of the rubbery and resinous copolymers. The benzazide is then added to this mixture on a rubber mill at a temperature not over 110° F. and the mixture placed in a mold and cured under pressure at 320° F. for 20 minutes. A mold was used whereby ¼″ sheets of cellular product was produced. The density of the resulting cellular product is dependent upon the amount of blowing agent present and the density may range from 10 to 90 pounds per cubic foot of cellular material.

The cellular product made in accordance with the above-noted formula is admirably adapted for use as a shoe sole when using resin in amount up to 85 parts per 100 parts of rubber. The cellular material is sufficiently stiff to give the desired support to the foot and yet sufficiently flexible to permit proper flexing under walking conditions. The density of the composition can be adjusted to compare with that of leather, thus permitting the formation of a relatively lightweight shoe sole. The cellular material when used as a shoe sole may be dyed to resemble leather and the dye used adheres to the surface of the cellular material in such a way that it is not easily worn away during use. Therefore, there is no tendency for the cellular material to have an exposed raw surface. Blends using more than 100 parts of resin per 100 parts of rubber are stiff in ¼" sheets but are relatively flexible in sheets ⅛" to ⅟₁₆" thick and may be used for shoe uppers, insoles, and luggage.

The table below shows examples using varied amounts of resin blended with GR–S.

TABLE I

| Example | 4 | 5 | 6 | 7 | 8 | 9 | 10 |
|---|---|---|---|---|---|---|---|
| GR–S | 100 | 100 | 100 | 100 | 100 | 100 | 0 |
| Resin | 20 | 40 | 50 | 75 | 100 | 125 | 100 |
| Silene | 60 | 60 | 60 | 60 | 60 | 60 | |
| Azide | 8 | 8 | 8 | 8 | 8 | 8 | 8 |
| Wt./Cubic ft | 32 | 55.5 | 42.4 | | 52.5 | 53 | |
| Sp. Gravity | .52 | .88 | .68 | .735 | .835 | .845 | |
| Ross Flex | 252, 377(3) | 182, 035(4) | 182, 035(4) | | | 1 | |
| Hardness, Shore A | | | | 86 | 100 | 100+ | 100+ |
| Cure, Min. and Temp., °F | 25 / 320 | 25 / 320 | 25 / 320 | 25 / 320 | 25 / 320 | 25 / 320 | 25 / 320 |

The GR–S was a copolymer of 75 parts of butadiene-1,3 and 25 parts of styrene. The resin was a copolymer of 15 parts of butadiene-1,3 and 85 parts of styrene. The Silene was calcium silicate. The azide was a mixture of 1 part of isophthalylazide and 2 parts of terephthalylazide. All parts are by weight. The blended mixture was molded into a #12 shoe sole.

*Example 11*

A cellular product was made using the following formulation.

Buna N (copolymer of 33 acrylonitrile/67 butadiene-1,3) _____ 100
Mercaptobenzothiazole disulfide_____ 1.5
Diorthotolyl guanidine_____ 1.0
Stearic acid_____ 3.0
Cumar resin_____ 25.0
Azide _____ 8.0

The resulting cellular product weighed 9.2 pounds per cubic foot. The same azide used in Examples 4 through 10 was used here. The blended mixture was molded into a 6" x 6" x ¼" mold and cured for 30 minutes at 290° F.

*Example 12*

A cellular product was made using the following formula:

Neoprene (polychloroprene)_____ 100
ZnO_____ 4.0
Stearic acid_____ 3.0
Light petroleum oil_____ 25.0
p-tertiary butyl benzazide_____ 8

The resulting cellular product had a density of 10 pounds per cubic foot.

In each of Examples 4 through 12 the blending of the rubber and resin with the other compounding ingredients together with the blowing with the azide was done in the same manner as described in Example 3 above.

In addition to the specific carbonyl azides mentioned it is also desirable to employ p-chlorbenzoyl azide, p-isopropyl benzoyl azide, p-amyl benzoyl azide and p-octyl benzoyl azide. These azides are made by reacting the corresponding acid with phosphorous pentachloride or thionyl chloride at 70° F. to prepare the corresponding chloride and then reacting the corresponding chloride in a 50% acetone solution with a 35% water solution of sodium azide at 50° C. to produce the corresponding azide.

The carbonyl azide blowing agents of this invention form isocyanates as by-products on decomposition. Under certain conditions of use these isocyanates may be detrimental to health. The isocyanate by-products may be converted to products other than isocyanates through the use of a neutralizing agent. Any compound containing an active hydrogen may be used. For example, a hydroxyl containing compound may be used to bring about the desired conversion. Generally the use of a hydroxyl compound represented by the general formula R'OH reacts with the isocyanate represented by the general formula RNCO to form a carbamate having the general formula RNHCOOR'. Any aromatic or aliphatic alcohol may be used in equal molecular amounts including methyl, ethyl, propyl, isopropyl, amyl, hexyl, nonyl, lauryl alcohols, phenyl, cresol, resorcinol and ethylene glycol. The neutralizing agents are added prior to blowing without interfering with the blowing action of the azides. Any organic acid of general formula

may be used as a neutralizing agent for the isocyanate to form a substituted amide and carbon dioxide which acts as a supplementary blowing agent. Suitable acids include acetic, propionic, butyric and stearic acids. The higher acids and alcohols also have a plasticizing action on the blown cellular structure. Water is a neutralizing agent reacting with the isocyanates to form a symmetrically substituted urea and carbon dioxide.

While certain representative embodiments and details have been shown for the purpose of illustrating the invention, it will be apparent to those skilled in this art that various changes and modifications may be made therein without departing from the spirit or scope of the invention.

We claim:

As a new blowing agent, para tertiary butyl benzoyl azide.

References Cited in the file of this patent

UNITED STATES PATENTS 2,448,154     Richmond et al. _____ Aug. 31, 1948
2,529,512     Ott _____ Nov. 14, 1950

OTHER REFERENCES

Beilstein's Handbuch der Organischen Chemie 9, page 376, published 1926.

Wieland Zangew Chem. 39, 900 (1926), cited in Chem. Abst. 20, 3448, 1926.